United States Patent
Liang et al.

(10) Patent No.: US 11,650,948 B2
(45) Date of Patent: May 16, 2023

(54) SERVER IDENTIFICATION VIA A KEYBOARD/VIDEO/MOUSE SWITCH

(71) Applicant: HEWLETT PACKARD ENTERPRISE DEVELOPMENT LP, Houston, TX (US)

(72) Inventors: YuYing Liang, Taipei (TW); Chang-Ta Huang, Taipei (TW); Yu-Hsing Wu, Taipei (TW)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 16/882,950

(22) Filed: May 26, 2020

(65) Prior Publication Data

US 2021/0374084 A1 Dec. 2, 2021

(51) Int. Cl.
*G06F 13/40* (2006.01)
*H04L 69/16* (2022.01)
*G06F 21/31* (2013.01)

(52) U.S. Cl.
CPC .......... *G06F 13/4022* (2013.01); *G06F 21/31* (2013.01); *H04L 69/16* (2013.01)

(58) Field of Classification Search
CPC ....... G06F 13/4022; G06F 21/31; H04L 69/16
USPC ........................... 710/15, 18, 30, 33, 62, 316
See application file for complete search history.

(56) References Cited

U.S. PATENT DOCUMENTS

| | | | |
|---|---|---|---|
| 7,792,914 B2 | 9/2010 | Huang | |
| 8,332,523 B2* | 12/2012 | Weinstock | H04L 43/00 709/229 |
| 8,887,060 B2* | 11/2014 | Maity | G06F 9/452 715/740 |
| 9,258,693 B2* | 2/2016 | Stouder-Studenmund | H04W 8/005 |
| 2004/0015980 A1* | 1/2004 | Rowen | G06F 11/321 719/310 |

(Continued)

FOREIGN PATENT DOCUMENTS

JP 5534946 B2 7/2014

OTHER PUBLICATIONS

Geeks for Geeks, "TCP/IP Model"; https://www.geeksforgeeks.org/tcp-ip-model/; Apr. 15, 2020; 6 pages.
Hewlett Packard Enterprise Community, "UID Light is on"; https://community.hpe.com/t5/ProLiant-Servers-ML-DL-SL/UID-Light-is-on/td-p/7007160; May 2018; 3 pages.

(Continued)

*Primary Examiner* — Idriss N Alrobaye
*Assistant Examiner* — Henry W Yu
(74) *Attorney, Agent, or Firm* — Trop, Pruner & Hu, P.C.

(57) ABSTRACT

In a method for sending a server identifier to a KVM switch, a management processor of a server determines that a push button on an exterior surface of the server has been pushed. In response to determining that the push button has been pushed, the management processor generates a displayable image containing a server identifier for the server, includes the displayable image in a network message, and broadcasts the network message to a local network that includes the server and a KVM switch. In one example, the method also includes receiving the server button message at the KVM switch when the KVM switch is not switched to enable the server to control a video port of the KVM switch, and in response to receiving the server button message at the KVM switch, sending the displayable image to a monitor via the video port. Other implementations are described and claimed.

20 Claims, 6 Drawing Sheets

(56) References Cited

U.S. PATENT DOCUMENTS

| | | | |
|---|---|---|---|
| 2007/0109263 A1* | 5/2007 | Sim | G09G 5/006 345/161 |
| 2008/0005222 A1 | 1/2008 | Lambert et al. | |
| 2009/0144479 A1* | 6/2009 | Cui | G06F 3/023 710/316 |
| 2011/0161533 A1* | 6/2011 | Lin | G06F 3/0227 710/72 |
| 2012/0209988 A1 | 8/2012 | Pagan et al. | |
| 2013/0135821 A1 | 5/2013 | Hsien | |
| 2014/0082142 A1* | 3/2014 | Geffin | G06F 13/385 709/217 |
| 2016/0057008 A1* | 2/2016 | Liu | G06F 3/14 709/217 |
| 2017/0006576 A1 | 1/2017 | Barrett et al. | |
| 2017/0315951 A1 | 11/2017 | Tung | |
| 2018/0205607 A1 | 7/2018 | Palmer et al. | |
| 2019/0377422 A1* | 12/2019 | Sung | G09G 5/006 |

OTHER PUBLICATIONS

Hewlett Packard Enterprise Development LP, "HPE iLO 5 2.10 User Guide"; Dec. 2019; 487 pages.

Hewlett Packard Enterprise Development LP, "HPE ProLiant DL380Gen9 Server User Guide," "Home/Component identification/Front panel LEDs and buttons," Apr. 15, 2020, 2 page.s.

Hewlett Packard Enterprise Develpment LP, "HPE ProLiant DL380 Gen9 Server User Guide," "Home/Component identification/Front panel LEDs and buttons . . . "; Apr. 15, 2020; 1 page.

Hewlett Packard Enterprise Development LP, "QuickSpecs HPE ProLiant DL380Gen10 Server"; https://h20195.www2.hpe.com/v2/getpdf.aspx/a00008180ENUS.pdf; Jul. 1, 2019; 74 pages.

Intel Corporation et al., "IPMI, Intelligent Platform Management Interface Specification, Second Generation, v2.0, Document Revision 1.1"; Oct. 1, 2013; 17 pages.

Wikipedia, "KVM switch"; https://en.wikipedia.org/wiki/KVM_switch; Apr. 15, 2020; 9 pages.

* cited by examiner

SERVER IDENTIFICATION VIA A KEYBOARD/VIDEO/MOUSE SWITCH

BACKGROUND

A datacenter or lab environment may have a data processing system that includes multiple servers, and each server may have a different server identifier (ID). A data processing system with multiple servers may be referred to as a "multi-server data processing system" or simply a "multi-server system."

DETAILED DESCRIPTION

A multi-server system may also include a keyboard/video/mouse (KVM) switch, or multiple KVM switches, and each server may be connected to a KVM switch via a cable. For purposes of this disclosure, cables that connect servers to KVM switches may be referred to as "server cables." Also, the term "KVM switch" refers to a device with multiple server ports to accept server cables from multiple servers, with at least one input/output (I/O) port to accept at least one cable from at least one I/O device, and with a switching mechanism with a particular number of switch positions, with each switch position corresponding to one server port. The switching mechanism enables a user to selectively connect the I/O port to one of the server ports, to enable the user to utilize the I/O device to interact with the server that is connected to that server port. To interact with a desired server, the user can switch the switching mechanism to the switch position that corresponds to the server port for that server. In other words, the user can selectively connect the I/O port to a desired server port by using the switching mechanism to select the switch position which corresponds to that server port.

A human user (e.g., a system administrator) may thus use the KVM switch to interact with (e.g., to take control of) a specific server. In particular, if the user knows which switch position is connected to the desired server, the user may switch the KVM switch to that switch position. The user may then use I/O devices that are connected to the KVM switch to interact with the desired server.

However, in some cases, a user knows the physical location of the desired server (e.g., within a rack of servers), but the user does not know which KVM switch position corresponds to that server. In addition, the user may not know the server ID for the desired server. Consequently, the user may utilize trial and error to connect the KVM switch to the desired server.

One way to address the challenge of determining which switch position and which server ID corresponds to the server in a particular location is to label the server cables to identify the server to which each cable is connected. However, the user's usual position may be sitting or standing in front of a monitor that is connected to the KVM switch, and labels on server cables may not be visible from that position. Furthermore, it may be time consuming to label server cables properly, to change those labels as necessary whenever server locations change.

Another approach is for the user to create a table that indicates which servers are connected to which switch positions, with the information in that table to include a server ID and location information for each server. However, it may be time consuming to create and maintain accurate tables to indicate which servers in which locations are connected to which switch positions of the KVM switch. Also, it may be time consuming to find a desired server within a table that includes switch position information and server location information for dozens or hundreds of servers.

This disclosure describes technology for identifying a target server via a KVM switch. In one example, that technology involves a method for sending a server ID for a target server to a KVM switch in response to the pushing of an input device (e.g., a push button) on that target server. In addition, when the KVM switch receives the server ID, the KVM switch displays the server ID on a monitor connected to an I/O port of the KVM switch, whether or not the KVM switch is set to the switch position for the target server. The user may then use an input device connected to an I/O port of the KVM switch to send credentials to the target server. After the credentials are verified, the user may interact with the target server using I/O devices connected to the KVM switch.

Figure 1:
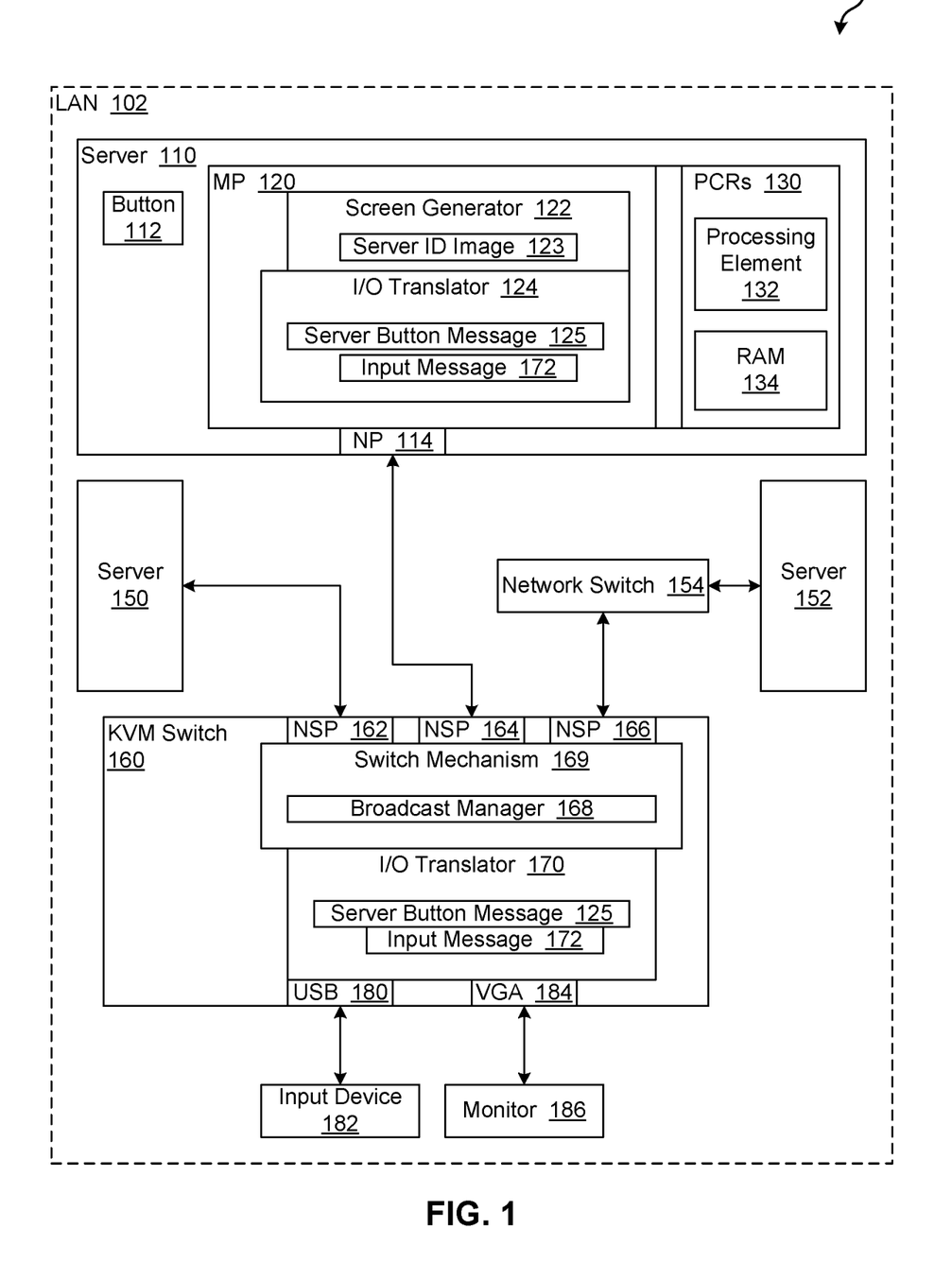
FIG. 1 is a block diagram of a multi-server data processing system with technology for identifying a target server via a KVM switch according to an example implementation.

FIG. 1 is a block diagram of a multi-server system 100 with technology for identifying a target server via a KVM switch 160 according to an example implementation. Multi-server system 100 includes multiple servers 110, 150, and 152 that are connected to KVM switch 160. Each server may connect to KVM switch 160 via a respective server cable. In particular, in the example of FIG. 1, servers 110, 150, and 152 connect to KVM switch 160 via network connections, and the server cables are network cables (e.g., ethernet cables). Accordingly, the server ports in KVM switch 160 are network ports. A network port may be implemented as a network interface controller (NIC), for example. For purposes of this disclosure, a network port in a KVM switch for connecting to a server may be referred to as a "network server port" (NSP). For purposes of this disclosure, a KVM switch with NSPs may be referred to as a "network KVM" (NKVM).

For ease of comprehension, FIG. 1 only shows three servers and three NSPs, with, with servers 150, 110, and 152 being connected to NSPs 162, 164, and 166, respectively. However, in other examples KVM switches include more than three server ports and corresponding switch positions. For instance, a KVM switch may include 4, 8, 16, 32, or more server ports and switch positions. Also, servers may connect directly to a KVM switch, or indirectly, such as through a network switch 154.

KVM switch 160 also includes I/O ports 180 and 184 connected to I/O devices. For instance, I/O port 184 may be a video output port that is connected to a display or monitor 186. In the example of FIG. 1, output port 184 is a Video Graphics Array (VGA) port, but other examples may have other kinds of video output ports, such as ports which follow the protocols identified by names or trademarks such as Digital Visual Interface (DVI), DisplayPort, High-Definition Multimedia Interface (HDMI), etc. Also, in the example of FIG. 1, input port 180 is a Universal Serial Bus (USB) port that is connected to an input device 182 or multiple input devices, such as a keyboard and a mouse, but other examples may have other kinds of input ports.

KVM switch 160 also includes a switching mechanism 169 that enables a user to connect I/O ports 180 and 184 to the NSP for a particular switch position. In particular, one example, switching mechanism 169 provides three different switch positions, and each switch position is identified numerically and associated with a different one of the NSPs, with switch position #1 associated with NSP 162, switch position #2 associated with NSP 164, and switch position #3 associated with NSP 166.

Each of the servers may include features like those illustrated in server 110. Server 110 includes primary includes primary computing resources (PCRs) 130, a management processor (MP) 120, a network port (NP) 114, and an input device such as a push button 112. NP 114 may be part of MP 120, or it may be coupled to and/or controlled by MP 120.

An MP may be implemented as a microcontroller, a system on a chip (SoC), an embedded processor, or any other suitable type of processor. In some examples, a management processor for a server or node serves as a node controller or a baseboard management controller (BMC) that provides for lights-out management (LOM) of the node. In other examples, multiple nodes may share a single management processor.

As used herein, the term "BMC" refers to a specialized service processor that monitors the physical state of a computer system using sensors and communicates with a management system through an independent "out-of-band" connection. A "computer system" can refer to a server computer, a user computer, or any electronic device or collection of electronic devices. The BMC may also communicate with applications executing at the OS level through an input/output controller (IOCTL) interface driver, a Representational state transfer (REST) application program interface (API), or some other system software proxy that facilitates communication between the BMC and applications. The BMC may have hardware-level access to hardware components located in the computer system. The BMC may be able to directly modify the hardware components. The BMC may operate independently of the operating system (OS) of the computer system that the BMC is located in. The BMC may be located on the motherboard or main circuit board of the computer system to be monitored. The fact that a BMC is mounted on a motherboard of the managed computer system or otherwise connected or attached to the managed computer system does not prevent the BMC from being considered separate from a processing resource that executes the OS. A BMC has management capabilities to manage components of the computer system. Examples of management capabilities of the BMC can include any or some combination of the following: power control, thermal monitoring and control, fan control, system health monitoring, remote access of the computer system, remote reboot of the computer system, system setup and deployment, system security, and so forth.

In some examples, a BMC can provide so-called "lights-out" functionality for computing devices. The lights out functionality may allow a user such as a systems user to perform management operations on the computer system even if an OS is not installed or not functional on the computer system. Moreover, in some examples, the BMC can run on auxiliary power (e.g., battery power); as a result, the computer system does not have to be powered on to allow the BMC to perform its operations. The services provided by the BMC may be considered "out-of-band" services, since the OS may not be running and in some cases the computer system may be powered off or not functioning properly (e.g., the computer system has experienced a fault or hardware failure).

The BMC may include a communication interface, such as a network port, and/or a serial interface that a user or other entity can use to remotely communicate with the BMC. An "out-of-band" service can be provided by the BMC via a dedicated management channel (e.g., the communication interface), and the "out-of-band" service can be available whether or not the computer system is in a powered on state.

PCRs 130 include a processing element 132, random access memory (RAM) 134, and possibly other components (e.g., non-volatile storage (NVS), software, etc.) which enable server 110 to perform useful work. A processing element can be a central processing unit (CPU), a microprocessor, or any other suitable type of electronic circuit (or a collection of CPUs, microprocessors, and/or other electronic circuits) that can retrieve and execute instructions. For instance, a processing element in a data processing system can be capable of executing an OS that enables the data processing system to operate as a server that provides hosting services which can be used by clients.

MP 120 is coupled to PCRs 130 and to button 112. In particular, MP 120 monitors button 112 and PCRs 130, and MP 120 may send data pertaining to button 112 and data pertaining to PCRs 130 to other devices. MP 120 may also interact with PCRs 130 based on data received from other devices.

In some examples, many different servers are connected to a KVM switch. For instance, in one scenario, 32 blade servers reside in a server rack, and each is connected to a KVM switch that includes at least 32 server ports and corresponding switch positions. Each of those servers resides in a particular physical location within the rack. For instance, the servers may be arranged in 4 rows of 8 columns. And as indicated above, in some cases, a user knows the physical location of a desired or "target" server, but the user does not know which KVM switch position corresponds to that server. For instance, the user may know that the target server is the first server on the left in the top row. But the user may not know which KVM switch position corresponds to the target server.

However, according to the present disclosure, each server may include an input device such as push button on an outer surface or "face" of the server (e.g., the front face), and that button may help the user to determine which KVM switch position corresponds to a particular server. That button may be referred to as a "server button," and a face of a server may also be referred to as a "side" or a "wall." For instance, in the example of FIG. 1, server button 112 resides on the front face of server 110.

In one scenario, server 110 is the target server. For instance, the user may see that a warning light on the face of server 110 is shining. Consequently, the user may want to interact with server 110 via KVM switch 160. However, the user may not know which switch position of KVM switch 160 corresponds to server 110. The user may then push server button 112, to cause server 110 to broadcast a message that causes KVM switch 160 to display the server ID for server 110 on monitor 186. In particular, when MP 120 in server 110 detects that server button 112 has been pushed, MP 120 generates a server button message 125 that includes the server ID for server 110, and MP 120 broadcasts server button message 125 via NP 114 to the local area network (LAN) 102 that includes KVM switch 160. And when KVM switch 160 receives server button message 125, KVM switch 160 sends to server ID to monitor 186 for display.

Additional details for server 110 and KVM switch 160 are provided below in connection with FIGS. 2 and 3.

Figure 2:
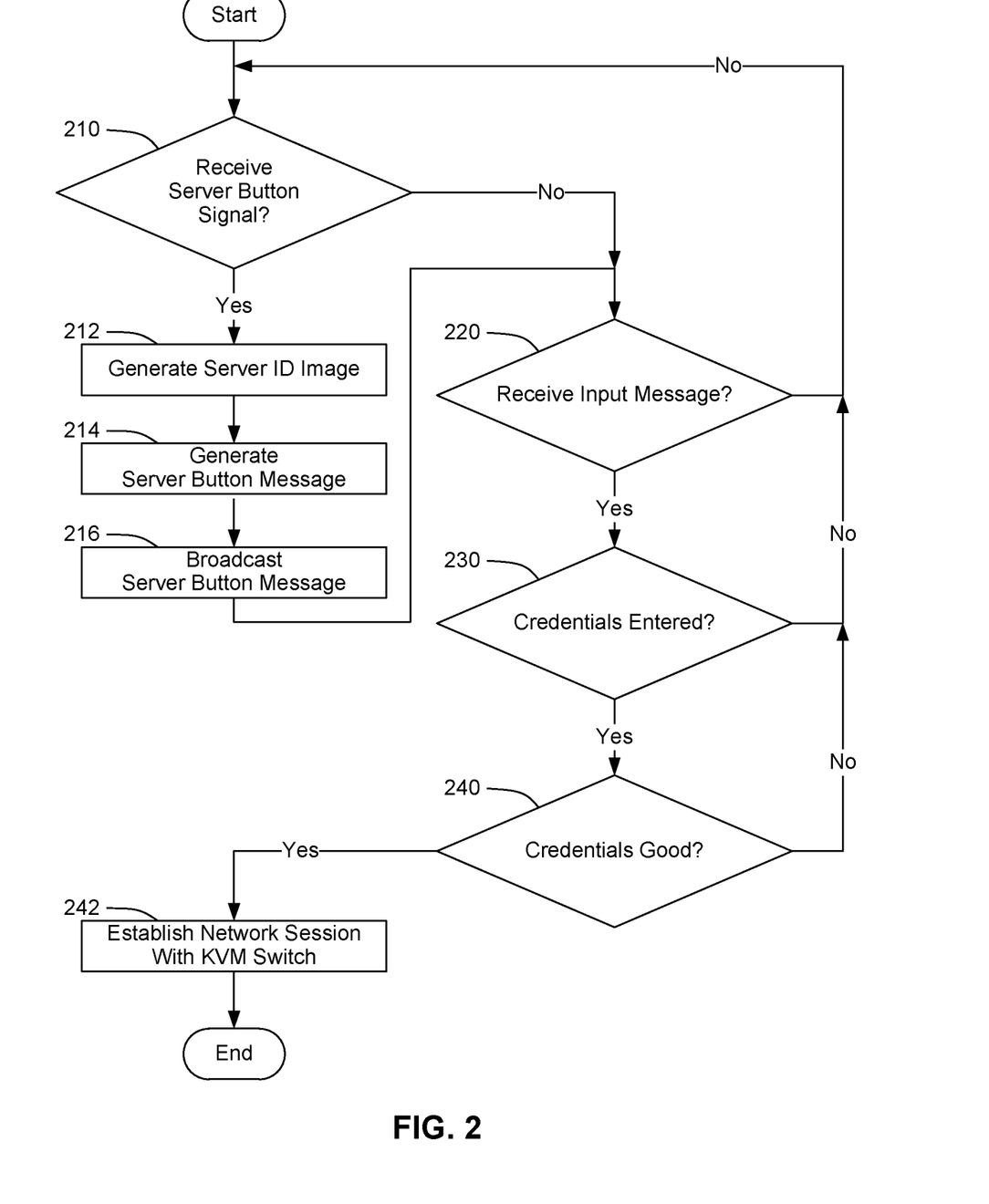
FIGS. 2 and 3 are flowcharts illustrating a process for identifying a target server via a KVM switch according to an example implementation.
Figure 3:
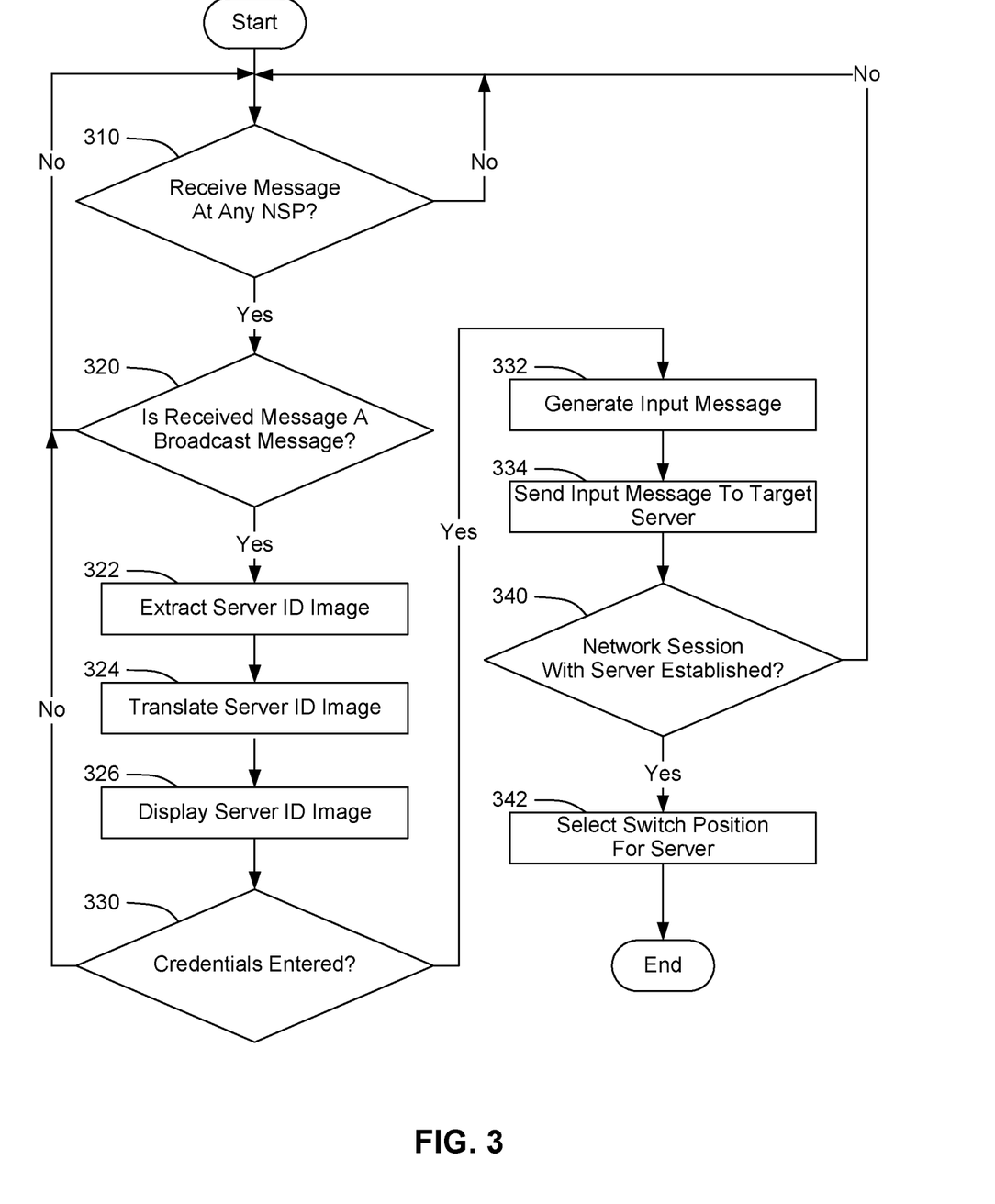

FIGS. 2 and 3 are flowcharts illustrating a process for identifying a target server via a KVM switch according to an example implementation. In particular, FIG. 2 focuses on the operations performed by the target server (server 110, in the example scenario), while FIG. 3 focuses on the operations performed by KVM switch 160. Also, the process is described in connection with an example scenario in which a user desires to use KVM switch 160 to interact with server 110, and the user knows the physical location of server 110, but the user does not know which switch position of KVM switch 160 corresponds to server 110. Also, for purposes of illustration, the server ID for server 110 is "Server 110."

The process of FIG. 2 starts with MP 120 in server 110 waiting for a signal from server button 112, as shown at block 210. When a person presses server button 112, server button 112 generates a signal that is detected by MP 120. When MP 120 detects that signal from server button 112, a screen generator 122 in MP 120 generates a server ID image 123, as shown at block 212. Server ID image 123 is data that encodes a visual image which indicates that a server button has been pressed and which identifies the server to which that button belongs. In particular, when server button 112 is pressed, server ID image 123 identifies server 110 as the target server. The visual image may also include a prompt for credentials. For instance, server ID image 123 may be a bitmap of a screen that says "The server button on Server 110 has been pressed. To connect, enter credentials for Server 110." Thus, the screen may identify the target server and prompt the user for corresponding credentials. In other examples, server ID images may use different formats to encode visual images, such as a format defined by the Moving Picture Experts Group (MPEG).

As shown at block 214, an I/O translator 124 in MP 120 then generates server button message 125 based on server ID image 123. In other words, I/O translator 124 packs server ID image 123 into server button message 125. In particular, I/O translator 124 formats server button message 125 as a network message which includes multiple fields, those fields include a field for destination address. And I/O translator 124 populates the field for destination address with a broadcast address. In one example, server 110 and KVM switch 160 reside within the same subnetwork or subnet, and I/O translator 124 fills the destination address in server button message 125 with a broadcast address for that subnet.

Server 110 and KVM switch 160 may communicate using a network protocol stack with multiple layers. The network protocol may be described in terms of the Open Systems Interconnection (OSI) model, which has the following seven layers: (1) Physical Layer, (2) Data Link Layer, (3) Network Layer, (4) Transport Layer, (5) Session Layer, (6) Presentation Layer, and (7) Application Layer. Alternatively, the network protocol may be described in terms of the Transmission Control Protocol/Internet Protocol (TCP/IP) model, which has four layers. Those four layers are the Network Access Layer, the Internet Layer, the Transport Layer, and the Application Layer. The Network Access Layer corresponds generally to the first 2 layers of the OSI model (i.e., the Physical Layer and the Data Link Layer). The Internet Layer corresponds generally to the third layer of the OSI model (i.e., the Network Layer). The Transport Layer (which may also be referred to as the "Host-to-host Layer") corresponds generally to the Transport Layer in the OSI model. The Application Layer corresponds generally to all three of the layers at the top of the OSI model (i.e., the Session, Presentation, and Application Layers). For instance, server button message 125 may be a Transmission Control Protocol/Internet Protocol (TCP/IP) message, with IP being the protocol used for the Internet Layer, and TCP being the protocol used for the Transport Layer.

Different examples may involve different levels of complexity for the network communications between a server and a KVM switch. In general, relatively complex network communications may be referred to as "heavy," while relatively simple network communications may be referred to as "light." In particular, for purposes of this disclosure, the term "heavy" denotes network communications (and related items and operations) which requires processing at the Session Layer and at the Presentation Layer of the network protocol stack. By contrast, the term "light" denotes network communications (and related items and operations) which do not require operations at the Session Layer or do not require operations at the Presentation Layer. In other words, light network communications do not require operations for at least one layer from the group consisting of the Session Layer and the Presentation Layer.

Accordingly, in one example, a server may generate "heavy" server button messages, in that those messages involve significant operations at the Session Layer and the Presentation Layer. But in another example, a server may generate "light" server button messages, in that those messages involve no operations at the Session Layer and/or no operations at the Presentation Layer. Likewise, KVM switches in different examples may process the server button messages differently. For instance, when a server generates a light server button message, the KVM switch may use a light process to translate that message into output for the monitor. And when a server generates a heavy server button message, the KVM switch may use a heavy process to translate that message into output for the monitor. Thus, in a "light example," the server sends a light server button message, and the KVM switch uses a light process to handle that message. And in a "heavy example," the server generates a heavy server button message, and the KVM switch uses a heavy process to handle that message.

In some examples, an MP in a server may use a heavy process by default for network communications, and a KVM switch may use the light process by default. For instance, the default network protocol of MP 120 may be heavy, and the default network protocol of KVM switch 160 may be light.

Generating a Server Button Message, Heavy Example

In a heavy example, MP 120 is configured with a default network protocol that is relatively complex. In particular, that default network protocol involves relatively complex operations at layers five through seven of the OSI model. The operations of that default network protocol may include the following:

Identifying the protocol used by messages or packages received by MP 120.
    Identifying the encryption method used by those messages.
    Decrypting those messages.
    Identifying the application used by those messages.
    Converting the payload into I/O signals (or otherwise processing the payload).
    Sending the I/O signals to the PCRs (e.g., to a CPU).

And MP 120 may use the same or similar kinds of operations (e.g., inverse operations) when generating and transmitting heavy server button messages. For instance, when generating server button message 125, I/O translator 124 may populate the following types of fields in server button message 125 as indicated below:
Network Packet Type: broadcast.
Message Type: video output.
Application Type: a particular type of application that decodes server ID image 123 and converts it to signals for output port 184.
Payload: server ID image 123.
In addition, I/O translator 124 may configure server button message 125 with the following attributes for the protocol layers listed below:
Session Layer: RPC.
Presentation Layer: bitmap (or MPEG).
Application Layer: decode the bitmap (or MPEG) and convert it into VGA signals.
Since this type of server button message requires processing at the Session Layer and at the Presentation Layer of the network protocol stack, it may be referred to as a "heavy server button message."

Generating a Server Button Message, Light Example

By contrast, when I/O translator 124 generates a light server button message 125, I/O translator 124 configures server button message 125 with the following attributes for the protocol layers listed below:
Transport Layer: destination media access control (MAC) address of video output port on KVM.
Session Layer: none.
Presentation Layer: none.
Application Layer: forward the message payload (server ID image 123) to video output port.
Since this type of server button message does not require processing at the Session Layer or the Presentation Layer of the network protocol stack, it may be referred to as a "light server button message."

Broadcasting a Server Button Message

After generating server button message 125 as either a heavy or a light message, MP 120 then broadcasts server button message 125 to LAN 102 via NP 114, as shown at block 216 of FIG. 2. MP 120 may then wait to receive an input message from KVM switch, or to detect that server button 112 has been pushed again.

Receiving a Server Button Message

After MP 120 broadcasts server button message 125, KVM switch 160 then receives server button message 125. As shown at blocks 310 and 320 of FIG. 3, when KVM switch 160 receives a network message at any NSP, a broadcast manager 168 in KVM switch 160 determines whether that message is a broadcast message (e.g., based on the destination address in the message). Broadcast manager 168 may conclude that any broadcast message received by any NSP is a server button message. In other words, KVM switch determines that a received message is a server button message, based on a determination that the message was a broadcast message.

In response to receiving server button message 125 and determining that it is a server button message, broadcast manager 168 may forward server button message 125 to an I/O translator 170 in KVM switch 160. In response, as shown at block 322, I/O translator 170 extracts server ID image 123 from server button message 125. Then, as shown at block 324, I/O translator 170 translates server ID image 123 into a format suitable for VGA port 184. And as shown at block 326, I/O translator 170 then sends the translated image to monitor 186 via VGA port 184. Thus, I/O translator 170 causes monitor 186 to show server ID image 123 (e.g., in a pop-up window). And as indicated above, server ID image 123 identifies server 110 and instructs the user to enter credentials if the user wants to connect with the identified server.

The details of how I/O translator 170 extracts server ID image 123 from server button message 125 and converts server ID image 123 into signals for output port 184 are different, depending on whether server button message 125 is a heavy or a light server button message.

Processing a Server Button Message

When server button message 125 is a heavy server button message, it will require operations at the Session Layer and at the Presentation Layer of the network protocol stack. For instance, if MP 120 encrypted the payload, I/O translator 170 may be required to decrypt the payload at the Session Layer.

By contrast, when server button message 125 is a light server button message, it will not require operations at the Session Layer or it will not require operations at the Presentation Layer. For instance, if MP 120 did not encrypt the payload, I/O translator 170 may not need to perform decryption (or any other operations) at the Session Layer. Instead, I/O translator 170 may simply recognize that server button message 125 has payload for an output device, extract that payload from server button message 125, and forward the extracted data to that output device.

As indicated above, server ID image 123 may include a prompt for credentials. Consequently, when KVM switch 160 sends server ID image 123 to monitor 186, KVM switch may prompt the user for credentials. Moreover, it does not matter whether or not KVM switch is currently switched to the switch position for the target server. Regardless, KVM switch will receive server button message 125 and present server ID image 123 on monitor 186.

The user may then use input device 182 to enter credentials for accessing the target server. And regardless of whether or not KVM switch 160 is currently switched to the switch position for the target server, KVM switch will forward that input to server 110, as described in greater detail below.

As shown at block 330, KVM switch 160 may determine whether a user has entered credentials (e.g., using input device 182.) If no credentials have been entered, the process may return to block 310, with KVM switch 160 waiting to receive messages at any NSP and proceeding accordingly, as indicated above.

Generating an Input Message

If credentials have been entered, I/O translator 170 generates an input message 172 with a payload containing the credentials that were entered by the user, as shown at block 332. In particular, if the user enters credentials using input device 182, I/O translator 170 receives that user input via USB port 180. I/O translator 170 then packs that user input into a message that can be sent to MP 120, after translating the format of the input, if necessary. Such a message is illustrated in FIG. 1 as input message 172. Furthermore, I/O translator 170 formats input message 172 according to the application type specified by server button message 125.

Then, as shown at block 334, KVM switch 160 sends input message 172 to MP 120 in server 110 via NSP 164 and NP 114.

Processing an Input Message

Referring again to FIG. 2, at block 220 MP 120 determines whether it has received an input message. As shown at block 230, if an input message has been received, MP 120 may then determine whether that input message (e.g., input message 172) includes credentials that were entered by a user of KVM switch 160. As shown at block 240, if input message 172 contains credentials, MP 120 may then determine whether the credentials are good (e.g., whether the credential include a userid that is authorized to access server 110, and a password to authenticate that the person who entered that userid is the authorized user).

The details of how MP 120 extracts the payload from input message 172 and converts that payload into signals for PCRs 130 are different, depending on whether input message 172 is a heavy or a light input message. When input message 172 is a heavy input message, it will require operations at the Session Layer and at the Presentation Layer of the network protocol stack. For instance, if KVM switch 160 encrypted the payload, MP 120 may be required to decrypt the payload at the Session Layer. But when input message 172 is a light input message, it will not require operations at the Session Layer or it will not require operations at the Presentation Layer.

In one example, when MP 120 receives input message 172, I/O translator 124 translates the payload back into user input signals (e.g., keyboard and/or mouse input), and sends those user input signals to PCRs 130 (e.g., to a CPU). Server 110 then processes that user input as if it had been entered locally at server 110.

Referring again to block 240 of FIG. 2, if the credentials are good, MP 120 may then establish a network session with KVM switch 160, as shown at block 242. Then, during that network session, the user may use the I/O devices that are connected to KVM switch 160 to interact with server 110. For instance, the user may perform remote control of server 110 via a secure connection between KVM switch 160 and MP 120. That remote control session may end when the user logs out from server 110 or the session times out.

However, if the determination at block 220, 230, or 240 is negative, the process may return to block 210, with MP 120 waiting for another signal from server button 112.

Referring again to block 242, if MP 120 establishes a network session with KVM switch 160, the process for establishing that session may affect the configuration of KVM switch 160. For instance, referring again to block 340 of FIG. 3, KVM switch 160 may determine whether server 110 has established a network session with KVM switch 160. If such a session is established, KVM switch 160 automatically adjusts switch mechanism 169 to select the switch position that connects the I/O ports of KVM switch 160 to the server port for server 110, as shown at block 342.

Once the MP 120 has established the network session with KVM switch 160, MP 120 then converts the video output signals from PCRs 130 into output messages directed to KVM switch 160, and MP 120 converts input messages from KVM switch 160 into input for PCRs 130 (e.g., for a CPU). When generating such output messages, MP 120 may use a format such as the following:

Network Packet Type: KVM VGA specific destination (e.g., a MAC address of VGA port 184, or a MAC address of KVM switch 160 which has been bound to a device ID for VGA port 184).
Message Type: video output.
Application Type: a particular type of application that decodes server ID image 123 and converts it to signals for VGA port 184.
Payload: Server 110 Screen output.

When MP 120 receives such input messages, MP 120 may recognize them as coming from a MAC address for USB port 180, or a MAC address of KVM switch 160 which has been bound to a device ID for USB port 180.

Referring again to block 342 of FIG. 3, in one example, KVM switch 160 adjusts switch mechanism 169 to connect the I/O ports of KVM switch 160 to server 110 by providing MP 120 with an input source address (e.g., the address for USB port 180) and an output destination address (e.g., the address for VGA port 184).

Figure 4:
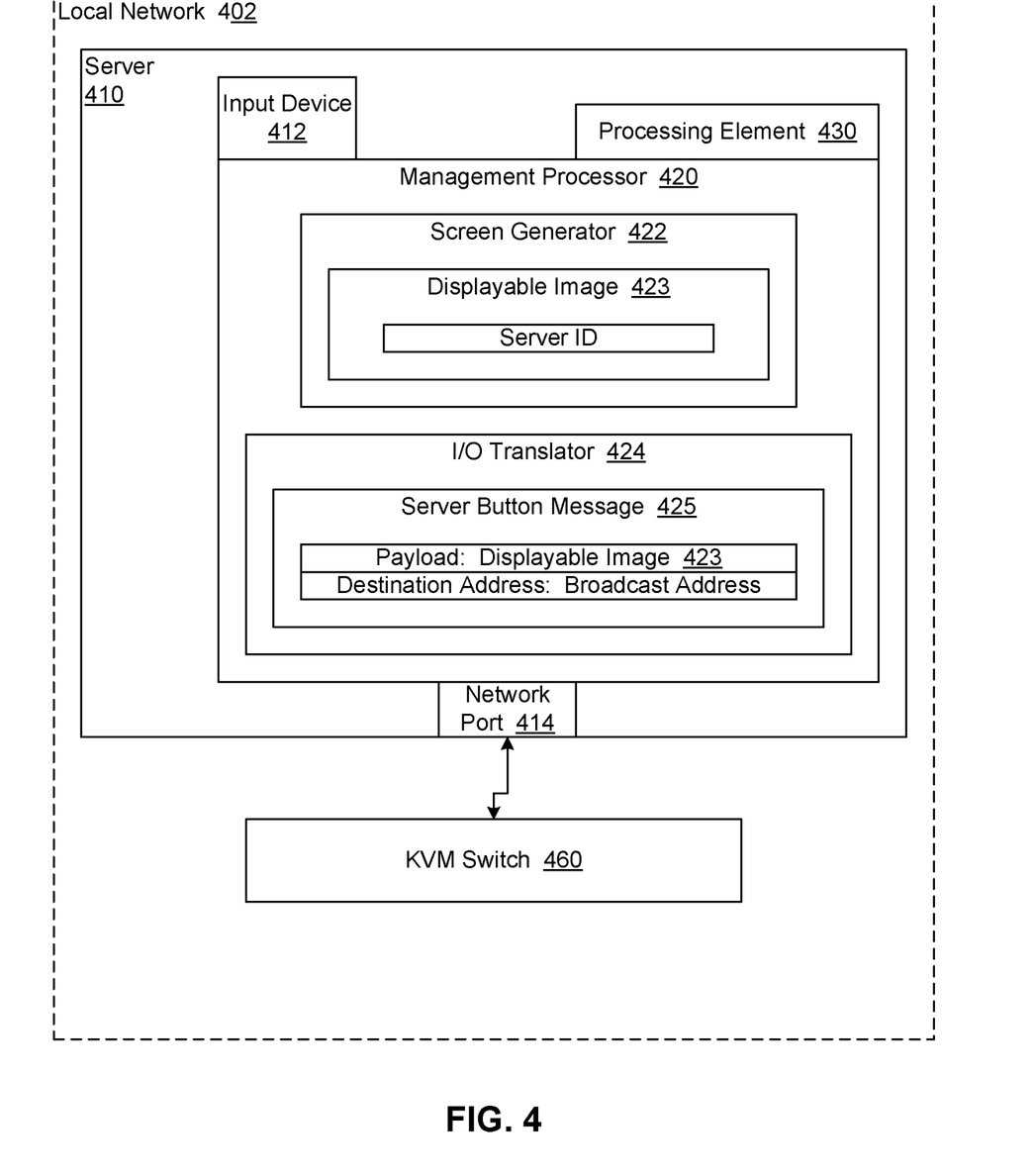
FIG. 4 is a block diagram showing a server with technology for broadcasting an identifier for the server to a KVM switch.

FIG. 4 is a block diagram showing a server 410 with technology for broadcasting an identifier for server 410 to a KVM switch 460. In the example of FIG. 4, server 410 comprises a CPU 430, a management processor 420 to communicate with CPU 430 and with an input device 412, and a network port 414 coupled to management processor 420. Management processor 420 comprises a screen generator 422 to generate a displayable image 423 for a server button message 425 in response to detecting that input device 412 has been manipulated, wherein displayable image 423 comprises a server identifier for server 410. Management processor 420 also comprises an I/O translator 424 to generate server button message 425 as a network message, and then to broadcast server button message 425 via network port 414 to a local network 402 that includes a KVM switch 460. Also, the operation of generating server button message 425 as a network message comprises including displayable image 423 as payload in server button message 425 and including a broadcast address as a destination address in server button message 425.

In some examples that may be in combination with the foregoing example, the server further comprises an exterior surface and a push button on the exterior surface, wherein the push button comprises the input device. Also, the screen generator is to generate the displayable image in response to detecting that the push button has been pushed.

In some examples that may be in combination with any of the foregoing examples, the server button message comprises a TCP/IP message.

In some examples that may be in combination with any of the foregoing examples, the server comprises data storage to store an address for a subnetwork that includes the server and the KVM switch. Also, the I/O translator is to specify the destination address for the server button message as a subnetwork broadcast address for the subnetwork that includes the server and the KVM switch.

In some examples that may be in combination with any of the foregoing examples, the management processor comprises NVS, and the I/O translator comprises software that resides in the NVS.

In some examples that may be in combination with any of the foregoing examples, the management processor comprises NVS, and the screen generator comprises software that resides in the NVS.

In some examples that may be in combination with any of the foregoing examples, the management processor comprises a BMC.

Figure 5:
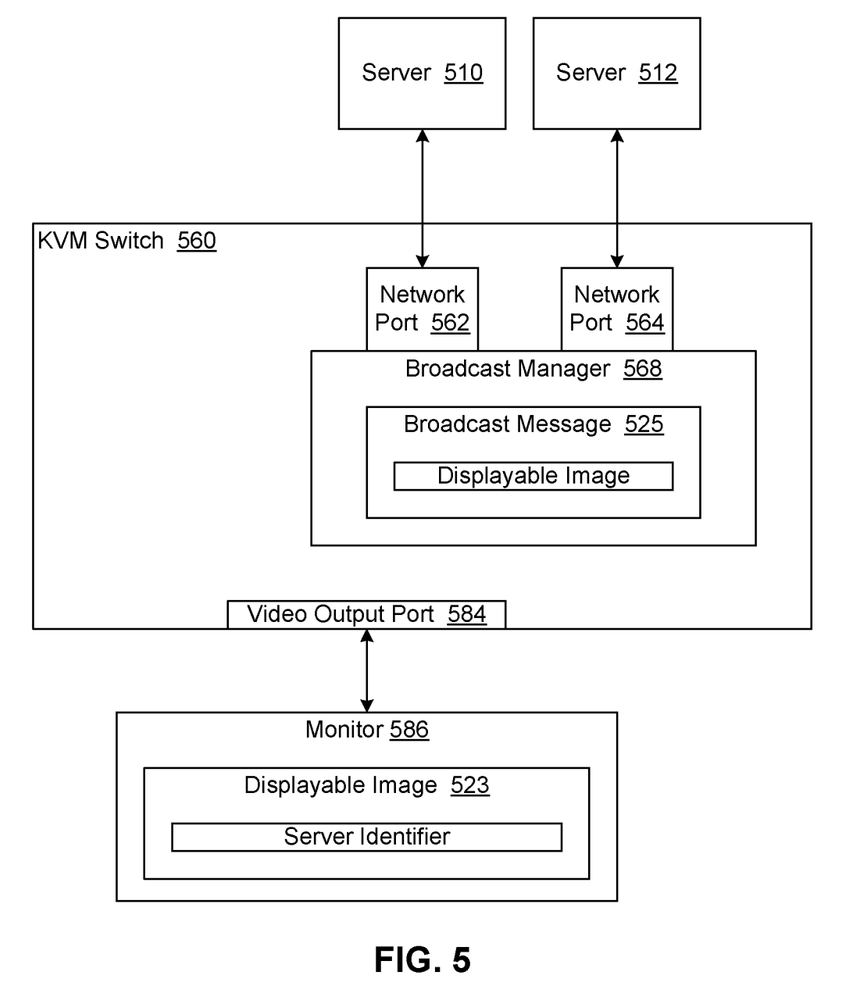
FIG. 5 is a block diagram showing a KVM switch with technology for identifying a target server.

FIG. 5 is a block diagram showing a KVM switch 560 with technology for identifying a target server 510. KVM switch 560 comprises network ports 562 and 564 to receive network communications from multiple servers 510 and 512. KVM switch 560 also comprises a video output port 584 to send video data to a monitor 586. KVM switch 560 also comprises a broadcast manager 568 to determine that one of the network ports has received a broadcast message 525 from a triggered server among servers 510 and 512 and, in response to determining that one of the network ports has received broadcast message 525, to cause KVM switch 560 to send a displayable image 523 from broadcast message 525 to video output port 584, wherein displayable image 523 includes a server identifier for the triggered server.

In some examples that may be in combination with the foregoing example, the triggered server comprises a server with an input device that has been manipulated by a person to initiate generation of a server button message to identify the triggered server, and the broadcast message received by the KVM switch comprises the server button message.

In some examples that may be in combination with any of the foregoing examples, the server button message comprises a TCP/I) message.

In some examples that may be in combination with any of the foregoing examples, the broadcast manager is to cause the KVM switch to send the displayable image with the server identifier for the triggered server to the video output port even when the KVM switch is not switched to enable the triggered server to control the video output port when the KVM switch receives the broadcast message.

In some examples that may be in combination with any of the foregoing examples, the KVM switch further comprises an I/O translator to send the displayable image from the broadcast message to the video output port, in response to the broadcast manager determining that one of the network ports has received the broadcast message.

Figure 6:
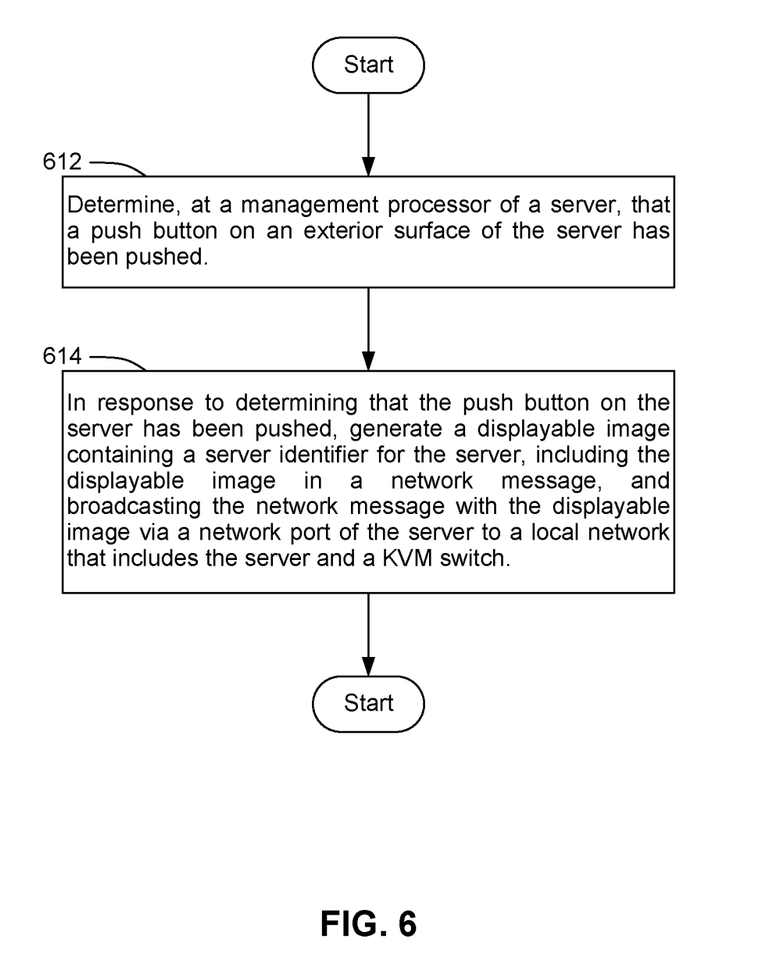
FIG. 6 is a flowchart illustrating a method for broadcasting a server ID for a target server.

FIG. 6 is a flowchart illustrating a method for broadcasting a server ID for a target server. As illustrated at block 612, the method comprises determining, at a management processor of a server, that a push button on an exterior surface of the server has been pushed. As illustrated at block 614, the method also comprises, in response to determining that the push button on the server has been pushed, generating a displayable image containing a server identifier for the server, including the displayable image in a network message, and broadcasting the network message with the displayable image via a network port of the server to a local network that includes the server and a KVM switch.

In some examples that may be in combination with the foregoing example, the operation of broadcasting the network message with the displayable image to the local network that includes the KVM switch is performed when the KVM switch is not switched to enable the server to control a video output port of the KVM switch.

In some examples that may be in combination with any of the foregoing examples, the network message comprises a server button message, and the operation of including the displayable image in the network message comprises including the displayable image as payload in the server button message. Also, the method further comprises including a broadcast address as a destination address in the server button message.

In some examples that may be in combination with any of the foregoing examples, the broadcast address comprises a subnetwork broadcast address for a subnetwork that includes the server and the KVM switch.

In some examples that may be in combination with any of the foregoing examples, the method further comprises receiving the server button message at the KVM switch when the KVM switch is not switched to enable the server to control a video output port of the KVM switch, and in response to receiving the server button message at the KVM switch, sending the displayable image from the server button message to a monitor via the video output port of the KVM switch, wherein the displayable image includes the server identifier for the server.

In some examples that may be in combination with any of the foregoing examples, the displayable image further comprises a prompt for credentials. Also, the method further comprises, after sending the displayable image from the server button message to the monitor, receiving user credentials from an input device coupled to the KVM switch; in response to receiving the user credentials, sending the user credentials from the KVM switch to the server; in response to receiving the user credentials at the server, determine whether the user credentials are acceptable; and in response to determining that the user credentials are acceptable, allowing the server to be controlled from the KVM switch.

In some examples that may be in combination with any of the foregoing examples, the operation of allowing the server to be controlled from the KVM switch comprises receiving input messages from the KVM switch at the management processor, generating input signals based on the input messages, and sending the input signals to a processing element in the server.

In some examples that may be in combination with any of the foregoing examples, the operation of allowing the server to be controlled from the KVM switch comprises, at the management processor, receiving video output data from the processing element; generating an output message based on the video output data; and sending the output message to an address associated with an output port of the KVM switch.

While the present disclosure has been described with respect to a limited number of implementations or examples, those skilled in the art, having the benefit of this disclosure, will appreciate numerous modifications and variations therefrom. It is intended that the appended claims cover all such modifications and variations.

What is claimed is:

1. A server comprising:
a processing element;
a management processor to communicate with the processing element and with an input device; and
a network port coupled to the management processor;
wherein the management processor comprises:
a screen generator to generate a displayable image for a server button message in response to detecting that the input device has been manipulated, wherein the displayable image comprises a server identifier for the server; and
an input/output (I/O) translator to generate the server button message as a network message, and then to broadcast the server button message via the network port to a local network that includes a keyboard/video/mouse (KVM) switch, wherein generating the server button message as a network message comprises including the displayable image as payload in the server button message and including a broadcast address as a destination address in the server button message.

2. A server according to claim 1, wherein:
the server further comprises an exterior surface and a push button on the exterior surface, wherein the push button comprises the input device; and
the screen generator is to generate the displayable image in response to detecting that the push button has been pushed.

3. A server according to claim 1, wherein the server button message comprises a Transmission Control Protocol/Internet Protocol (TCP/IP) message.

4. A server according to claim 1, wherein:
the server comprises data storage to store an address for a subnetwork that includes the server and the KVM switch; and the I/O translator is to specify the destination address for the server button message as a subnetwork broadcast address for the subnetwork that includes the server and the KVM switch.

5. A server according to claim 1, wherein:
the management processor comprises non-volatile storage (NVS); and
the I/O translator comprises software that resides in the NVS.

6. A server according to claim 1, wherein:
the management processor comprises non-volatile storage (NVS); and
the screen generator comprises software that resides in the NVS.

7. A server according to claim 1, wherein the management processor comprises a baseboard management controller (BMC).

8. A keyboard/video/mouse (KVM) switch, comprising:
multiple network ports to receive network communications from multiple servers;
a video output port to send video data to a monitor; and
a broadcast manager to:
determine that a given network port of the multiple network ports has received a broadcast message from a triggered server among the multiple servers, wherein the broadcast message comprises a destination address field containing information representing a broadcast address; and
in response to determining that the given network port has received the broadcast message, cause the KVM switch to send a displayable image from the broadcast message to the video output port, wherein the displayable image includes a server identifier for the triggered server.

9. A KVM switch according to claim 8, wherein:
the triggered server comprises a server with an input device that has been manipulated by a person to initiate generation of a server button message to identify the triggered server; and
the broadcast message received by the KVM switch comprises the server button message.

10. A KVM switch according to claim 9, wherein the server button message comprises a Transmission Control Protocol/Internet Protocol (TCP/IP) message.

11. A KVM switch according to claim 8, wherein the broadcast manager is to cause the KVM switch to send the displayable image with the server identifier for the triggered server to the video output port responsive to the KVM switch not being switched to enable the triggered server to control the video output port when the KVM switch receives the broadcast message.

12. A KVM switch according to claim 8, further comprising:
an I/O translator to send the displayable image from the broadcast message to the video output port, in response to the broadcast manager determining that one of the network ports has received the broadcast message.

13. A method for identifying a target server via a keyboard/video/mouse (KVM) switch, the method comprising:
determining, at a management processor of a server, that a push button on an exterior surface of the server has been pushed; and
in response to determining that the push button on the server has been pushed:
generating a displayable image containing a server identifier for the server;
generating a network message, wherein the generating comprises including a broadcast address as a destination address in a destination address field of the network message; and
broadcasting the network message with the displayable image via a network port of the server to a local network that includes the server and a KVM switch.

14. A method according to claim 13, wherein the operation of broadcasting the network message with the displayable image to the local network that includes the KVM switch is performed when the KVM switch is not switched to enable the server to control a video output port of the KVM switch.

15. A method according to claim 13, wherein:
the network message comprises a server button message; and
generating the network message comprises including the displayable image as a payload in the server button message.

16. A method according to claim 13, wherein the broadcast address comprises a subnetwork broadcast address for a subnetwork that includes the server and the KVM switch.

17. A method according to claim 15, further comprising:
receiving the server button message at the KVM switch when the KVM switch is not switched to enable the server to control a video output port of the KVM switch; and
in response to receiving the server button message at the KVM switch, sending the displayable image from the server button message to a monitor via the video output port of the KVM switch, wherein the displayable image includes the server identifier for the server.

18. A method according to claim 17, wherein:
the displayable image further comprises a prompt for credentials; and
the method further comprises:
after sending the displayable image from the server button message to the monitor, receiving user credentials from an input device coupled to the KVM switch;
in response to receiving the user credentials, sending the user credentials from the KVM switch to the server;
in response to receiving the user credentials at the server, determine whether the user credentials are acceptable; and
in response to determining that the user credentials are acceptable, allowing the server to be controlled from the KVM switch.

19. A method according to claim 18, wherein the operation of allowing the server to be controlled from the KVM switch comprises:
receiving input messages from the KVM switch at the management processor;
generating input signals based on the input messages; and
sending the input signals to a processing element in the server.

20. A method according to claim 18, wherein the operation of allowing the server to be controlled from the KVM switch comprises:
at the management processor, receiving video output data from the processing element;
generating an output message based on the video output data; and sending the output message to an address associated with an output port of the KVM switch.

* * * * *